US012700980B2

(12) United States Patent
Goektepe et al.

(10) Patent No.: US 12,700,980 B2
(45) Date of Patent: Aug. 4, 2026

(54) CHANNEL PROFILES FOR QUASI-STATIONARY DEVICE

(71) Applicant: Fraunhofer-Gesellschaft zur Foerderung der angewandten Forschung e.V., Munich (DE)

(72) Inventors: Baris Goektepe, Berlin (DE); Thomas Fehrenbach, Berlin (DE); Clemens Korn, Erlangen (DE); Julian Popp, Erlangen (DE); Josef Bernhard, Erlangen (DE); Thomas Wirth, Berlin (DE); Cornelius Hellge, Berlin (DE); Thomas Schierl, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 364 days.

(21) Appl. No.: 18/197,726

(22) Filed: May 16, 2023

(65) Prior Publication Data

US 2023/0403124 A1    Dec. 14, 2023

Related U.S. Application Data

(63) Continuation of application No. PCT/EP2021/081883, filed on Nov. 16, 2021.

(30) Foreign Application Priority Data

Nov. 17, 2020    (EP) .................................... 20208107

(51) Int. Cl.
*H04L 5/00*    (2006.01)
*H04W 24/08*    (2009.01)
(52) U.S. Cl.
CPC ........... *H04L 5/0094* (2013.01); *H04W 24/08* (2013.01)

(58) Field of Classification Search
CPC . H04L 5/0094; H04L 5/0048; H04L 25/0224; H04W 24/08; H04W 72/046;
(Continued)

(56) References Cited

U.S. PATENT DOCUMENTS

| | | | | |
|---|---|---|---|---|
| 2019/0268053 A1* | 8/2019 | John Wilson | ........ | H04B 7/0634 |
| 2020/0029315 A1 | 1/2020 | Lin et al. | | |

(Continued)

FOREIGN PATENT DOCUMENTS

| | | |
|---|---|---|
| CN | 111788857 A | 10/2020 |
| EP | 3905803 A1 | 11/2021 |

(Continued)

OTHER PUBLICATIONS

"Antenna Ports Quasi-Co-Location", 3GPP TS 38.214 V15.11.0 (Sep. 2020) Chapter 5.1.5, Sep. 2020, 106 pp.
(Continued)

*Primary Examiner* — Fred A Casca
(74) *Attorney, Agent, or Firm* — Perkins Coie LLP; Michael A. Glenn

(57)    ABSTRACT
A user device, UE, for a wireless communication network is described. The he UE performs measurements of one or more reference signals received from a network entity of the wireless communication network, each reference signal being associated with a TCI state. For transmitting or receiving a transmission associated with a certain TCI state, the UE uses one or more parameters obtained by the measurement of the reference signal being associated with the certain TCI state of the transmission. Responsive to a certain event, the UE resets parameters obtained by a measurement associated with the TCI state of at least one of the one or more reference signals.

13 Claims, 7 Drawing Sheets

(58) Field of Classification Search
CPC ............. H04W 24/10; H04W 72/0457; H04W
72/231; H04B 7/088
See application file for complete search history.

(56) References Cited

U.S. PATENT DOCUMENTS

2020/0112974 A1    4/2020  Sun et al.
2020/0128546 A1    4/2020  Shi et al.
2020/0229161 A1    7/2020  Raghavan et al.
2020/0260391 A1*   8/2020  Zhou ................... H04W 52/281
2020/0288479 A1    9/2020  Xi et al.
2020/0394926 A1*  12/2020  Naini ...................... H04W 4/44
2021/0045148 A1*   2/2021  Khoshnevisan ...... H04L 5/0051
2022/0191081 A1*   6/2022  Kim ..................... H04B 1/7156
2022/0279450 A1*   9/2022  Zhang ............... H04B 7/06952
2023/0056106 A1*   2/2023  Hao ...................... H04L 5/0091

FOREIGN PATENT DOCUMENTS

JP     2017034407  A    2/2017
KR     20200108238 A    9/2020
KR     20200124230 A   11/2020
WO     2019165224  A1   8/2019
WO     2019195528  A1  10/2019
WO     2020132885  A1   7/2020

OTHER PUBLICATIONS

"UE Power Consumption Reduction in RRM Measurements", 3GPP
Draft; RI-1901190, 3rd Generation Partnership Project (3GPP),
Mobile Competence Centr, vol. RAN WGI, No. Taipei, Taiwan; Jan.
21, 2019-Jan. 25, 2019 Jan. 11, 2019 (Jan. 11, 2019), XP051576721,
Jan. 11, 2019, 11 pp.

* cited by examiner

100

102    core network external networks backhaul 114

RAN₁

RAN₂    • • •    RANₙ

108₁    108₂

UE₁

UE₂ gNBs    core gNB₂

116₂    114₂

106₂

112₂    108₃    112₁

110₁

IoT    UE₃ gNBs    core gNB₄    114₄

116₄

106₄

ANT gNBs gNB₁

116₁    114₁

106₁

110₂ gNBs gNB₅

116₅    114₅

106₅ gNBs gNB₃

116₃    114₃

106₃

RANn

```
-- ASN1START
-- TAG-TCI-STATE-START
TCI-State ::=            SEQUENCE {
    tci-StateId             TCI-StateId,
    qcl-Type1               QCL-Info,
    qcl-Type2               QCL-Info        OPTIONAL,  -- Need R
}
QCL-Info ::=            SEQUENCE {
    cell                    ServCellIndex       OPTIONAL, --
Need R
    bwp-Id                  BWP-Id              OPTIONAL,  -- Cond
CSI-RS-Indicated
    referenceSignal         CHOICE {
        csi-rs                  NZP-CSI-RS-ResourceId,
        ssb                     SSB-Index
    },
    qcl-Type                ENUMERATED {typeA, typeB, typeC, typeD},
    ...
}
-- TAG-TCI-STATE-STOP
-- ASN1STOP
```

Fig. 2 cell with two bandwidth parts cell with three bandwidth parts, #1 and #3 are overlapping cell with three bandwidth parts, #1 and #3 are linked

CHANNEL PROFILES FOR QUASI-STATIONARY DEVICE

CROSS-REFERENCES TO RELATED APPLICATIONS

This application is a continuation of copending International Application No. PCT/EP2021/081883, filed Nov. 16, 2021, which is incorporated herein by reference in its entirety, and additionally claims priority from European Application No. EP 20 208 107.1, filed Nov. 17, 2020, which is incorporated herein by reference in its entirety.

The present invention relates to the field of wireless communication systems or networks, more specifically to measurement and sounding procedures performed by entities of the wireless communication network. Embodiments of the present invention concern improvements in the measurement and sounding procedures performed by entities which are quasi-stationary and/or are located in an environment that is characterized by slow changes or foreseeable changes, like slow or foreseeable changes in the channel properties or channel states of a channel between two or more of the entities of the wireless communication network.

BACKGROUND OF THE INVENTION

FIG. 1 is a schematic representation of an example of a terrestrial wireless network 100 including, as is shown in FIG. 1(a), the core network 102 and one or more radio access networks $RAN_1$, $RAN_2$, . . . $RAN_N$. FIG. 1(b) is a schematic representation of an example of a radio access network RAN D that may include one or more base stations $gNB_1$ to $gNB_5$, each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the $RAN_n$ may include more or less such cells, and RAN D may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(b) shows two IOT devices $110_1$ and $110_2$ in cell $106_4$, which may be stationary or mobile devices. The IOT device $110_1$ accesses the wireless communication system via the base station $gNB_4$ to receive and transmit data as schematically represented by arrow $112_1$. The IOT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. The external network may be the Internet, or a private network, such as an Intranet or any other type of campus networks, e.g. a private WiFi or 4G or 5G mobile communication system. Further, some or all of the respective base station $gNB_1$ to $gNB_5$ may be connected, e.g. via the S1 or X2 interface or the XN interface in NR, with each other via respective backhaul links $116_1$ to $116_5$, which are schematically represented in FIG. 1(b) by the arrows pointing to "gNBs". A sidelink channel allows direct communication between UEs, also referred to as device-to-device, D2D, communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink, uplink and sidelink shared channels, PDSCH, PUSCH, PSSCH, carrying user specific data, also referred to as downlink, uplink and sidelink payload data, the physical broadcast channel, PBCH, carrying for example a master information block, MIB, and one or more of a system information block, SIB, one or more sidelink information blocks, SLIBs, if supported, the physical downlink, uplink and sidelink control channels, PDCCH, PUCCH, PSSCH, carrying for example the downlink control information, DCI, the uplink control information, UCI, and the sidelink control information, SCI, and physical sidelink feedback channels, PSFCH, carrying PC5 feedback responses. Note, the sidelink interface may a support 2-stage SCI. This refers to a first control region containing some parts of the SCI, and optionally, a second control region, which contains a second part of control information.

For the uplink, the physical channels may further include the physical random-access channel, PRACH or RACH, used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix, CP, length. A frame may also consist of a smaller number of OFDM symbols, e.g. when utilizing shortened transmission time intervals, sTTI, or a mini-slot/non-slot-based frame structure comprising just a few OFDM symbols.

The wireless communication system may be any single-tone or multicarrier system using frequency-division multiplexing, like the orthogonal frequency-division multiplexing, OFDM, system, the orthogonal frequency-division multiple access, OFDMA, system, or any other IFFT-based signal with or without CP, e.g. DFT-s-OFDM. Other waveforms, like non-orthogonal waveforms for multiple access, e.g. filter-bank multicarrier, FBMC, generalized frequency division multiplexing, GFDM, or universal filtered multi carrier, UFMC, may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro cell including a macro base station, like base station $gNB_1$ to $gNB_5$, and a network of small cell base stations, not shown in FIG. 1, like femto or pico base stations. In addition to the above described terrestrial wireless network also non-terrestrial wireless communication networks, NTN, exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like a LTE or 5G/NR network, there may be UEs that communicate directly with each other over one or more sidelink, SL, channels, e.g., using the PC5/PC3 interface or WiFi direct. UEs that communicate directly with each other over the sidelink may include vehicles communicating directly with other vehicles, V2V communication, vehicles communicating with other entities of the wireless communication network, V2X communication, for example roadside units, RSUs, roadside entities, like traffic lights, traffic signs, or pedestrians. RSUs may have functionalities of BS or of UEs, depending on the specific network configuration. Other UEs may not be vehicular related UEs and may comprise any of the above-mentioned devices. Such devices may also communicate directly with each other, D2D communication, using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs may not be connected to a base station, for example, they are not in an RRC connected state, so that the UEs do not receive from the base station any sidelink resource allocation configuration or assistance, and/or may be connected to the base station, but, for one or more reasons, the base station may not provide sidelink resource allocation configuration or assistance for the UEs, and/or may be connected to the base station that may not support NR V2X services, e.g., GSM, UMTS, LTE base stations.

When considering two UEs directly communicating with each other over the sidelink, e.g., using the PC5/PC3 interface, one of the UEs may also be connected with a BS, and may relay information from the BS to the other UE via the sidelink interface and vice-versa. The relaying may be performed in the same frequency band, in-band-relay, or another frequency band, out-of-band relay, may be used. In the first case, communication on the Uu and on the sidelink may be decoupled using different time slots as in time division duplex, TDD, systems.

It is noted that the information in the above section is only for enhancing the understanding of the background of the invention and, therefore, it may contain information that does not form conventional technology that is already known to a person of ordinary skill in the art.

In a wireless communication network as described above, there may be a need for improvements in the measurement and sounding procedures to be performed by one or more of the entities of the wireless communication network.

SUMMARY

An embodiment may have a user device, UE, for a wireless communication network, wherein the UE is to perform measurements of one or more reference signals received from a network entity of the wireless communication network, each reference signal being associated with a TCI state, for transmitting or receiving a transmission associated with a certain TCI state, the UE is to use one or more parameters acquired by the measurement of the reference signal being associated with the certain TCI state of the transmission, and responsive to a certain event, the UE is to reset parameters acquired by a measurement associated with the TCI state of at least one of the one or more reference signals Another embodiment may have a user device, UE, for a wireless communication network, wherein the UE is to perform measurements of one or more reference signals received from a network entity of the wireless communication network, one or some or all of the reference signals being associated with a plurality of TCI states, like two or more TCI states, for transmitting or receiving a transmission associated with a certain TCI state, the UE is to use one or more parameters acquired by the measurement of the reference signal being associated with the certain TCI state of the transmission, wherein each TCI state of a certain reference signal is associated with a certain channel state of a channel between the UE and the network entity, and wherein the UE is to associate a measurement for a certain channel state with the TCI state of the certain reference signal associated with the certain channel state.

Another embodiment may have a user device, UE, for a wireless communication network, wherein the UE is to perform measurements of one or more reference signals received from a network entity of the wireless communication network, each reference signal being associated with a TCI state, for transmitting or receiving a transmission associated with a certain TCI state, the UE is to use one or more parameters acquired by the measurement of the reference signal being associated with the certain TCI state of the transmission, wherein the UE is configured with a plurality of sub-TCI states, each sub-TCI state being associated with a certain channel state of a channel between the UE and the network entity, and wherein the UE is to associate a measurement for a certain channel state with the sub-TCI state associated with the certain channel state.

Another embodiment may have a network entity for a wireless communication network, wherein the network entity is to transmit one or more reference signals, each reference signal being associated with a TCI state, a transmission to or from a user device, UE, of the wireless communication network is associated with a TCI state associated with one of the reference signals, and the network entity is to transmit an indication to the UE for causing the UE to reset the parameters acquired by a measurement associated with the TCI state of at least one of the one or more reference signals.

Another embodiment may have a network entity for a wireless communication network, wherein the network entity is to transmit one or more reference signals, one or some or all of the reference signals being associated with one or more TCI states, a transmission to or from a user device, UE, of the wireless communication network is associated with a TCI state associated with one of the reference signals, and the network entity is to configure the UE with a plurality of TCI states for a certain reference signal, each TCI state being associated with a certain channel state of a channel between the network entity and the UE so as to allow the UE to associate a measurement for a certain channel state with the TCI state associated with the certain channel state, or the network entity is to configure the UE with a plurality of sub-TCI states, each sub-TCI state being associated with a certain channel state of a channel between the network entity and the UE so as to allow the UE to associate a measurement for a certain channel state with the sub-TCI state associated with the certain channel state.

Another embodiment may have a wireless communication network, comprising one or more user devices according to the invention, and/or one or more network entities according to the invention.

Another embodiment may have a method for operating a user device, UE, for a wireless communication network, the method comprising: performing measurements of one or more reference signals received from a network entity of the wireless communication network, each reference signal being associated with a TCI state, for transmitting or receiving a transmission associated with a certain TCI state, using one or more parameters acquired by the measurement of the reference signal being associated with the certain TCI state of the transmission, and responsive to a certain event, resetting parameters acquired by a measurement associated with the TCI state of at least one of the one or more reference signals.

Another embodiment may have a method for operating a user device, UE, for a wireless communication network, the method comprising: performing measurements of one or more reference signals received from a network entity of the wireless communication network, one or some or all of the reference signals being associated with a plurality of TCI states, like two or more TCI states, for transmitting or receiving a transmission associated with a certain TCI state, using one or more parameters acquired by the measurement of the reference signal being associated with the certain TCI state of the transmission, wherein each TCI state of a certain reference signal is associated with a certain channel state of a channel between the UE and the network entity, and associating a measurement for a certain channel state with the TCI state of the certain reference signal associated with the certain channel state.

Another embodiment may have a method for operating a user device, UE, for a wireless communication network, the method comprising: performing measurements of one or more reference signals received from a network entity of the wireless communication network, each reference signal being associated with a TCI state, for transmitting or receiving a transmission associated with a certain TCI state, using one or more parameters acquired by the measurement of the reference signal being associated with the certain TCI state of the transmission, wherein the UE is configured with a plurality of sub-TCI states, each sub-TCI state being associated with a certain channel state of a channel between the UE and the network entity, and associating associate a measurement for a certain channel state with the sub-TCI state associated with the certain channel state.

Another embodiment may have a method for operating a network entity for a wireless communication network, the method comprising: transmitting one or more reference signals, each reference signal being associated with a TCI state, associating a transmission to or from a user device, UE, of the wireless communication network with a TCI state associated with one of the reference signals, and transmitting an indication to the UE for causing the UE to reset the parameters acquired by a measurement associated with the TCI state of at least one of the one or more reference signals.

Another embodiment may have a method for operating a network entity for a wireless communication network, the method comprising: transmitting one or more reference signals, one or some or all of the reference signals being associated with one or more TCI states, associating a transmission to or from a user device, UE, of the wireless communication network with a TCI state associated with one of the reference signals, and configuring the UE with a plurality of TCI states for a certain reference signal, each TCI state being associated with a certain channel state of a channel between the network entity and the UE so as to allow the UE to associate a measurement for a certain channel state with the TCI state associated with the certain channel state, or configuring the UE with a plurality of sub-TCI states, each sub-TCI state being associated with a certain channel state of a channel between the network entity and the UE so as to allow the UE to associate a measurement for a certain channel state with the sub-TCI state associated with the certain channel state.

Another embodiment may have a non-transitory digital storage medium having a computer program stored thereon to perform the methods according to the invention.

BRIEF DESCRIPTION OF THE DRAWINGS

Embodiments of the present invention will be detailed subsequently referring to the appended drawings, in which:

FIG. 1a-b is a schematic representation of an example of a terrestrial wireless network, wherein FIG. 1(a) illustrates a core network and one or more radio access networks, and FIG. 1(b) is a schematic representation of an example of a radio access network RAN;

FIG. 2 illustrates a conventional RRC configuration information element, IE, for configuring a TCI state at a UE;

DETAILED DESCRIPTION OF THE INVENTION

Figures 1A, 1B:
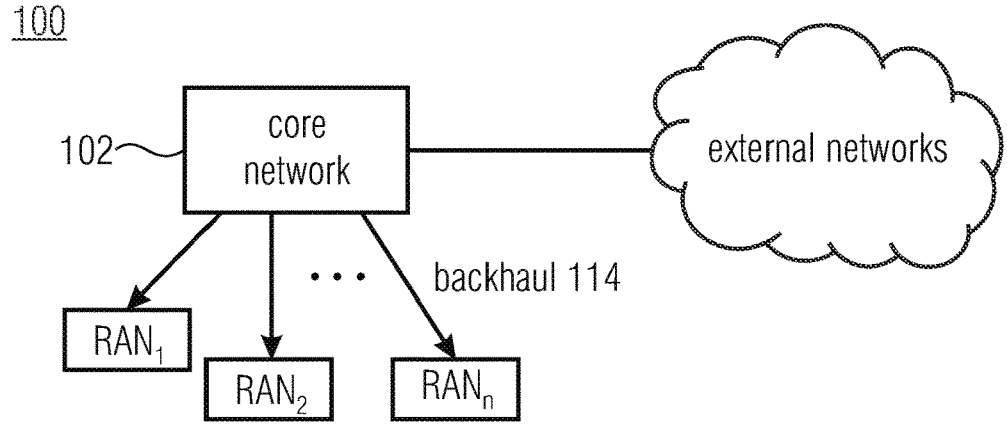

Embodiments of the present invention are now described in more detail with reference to the accompanying drawings, in which the same or similar elements have the same reference signs assigned.

In a wireless communication network as described above with reference to FIG. 1, there may be situations or use cases in which certain entities within the wireless communication network may be considered quasi-stationary. For example, such entities may be user devices, like IoT UEs or UEs having a reduced capability, also referred to as RedCap UEs, which may move at a slow speed, like a certain speed below a predefined threshold, or that are located at a fixed position, at least for a certain period and then may move to a different position, for example with a certain pattern indicating that such a UE moves in regular intervals. Such use cases may concern UEs located within fabrication halls or manufacturing facilities and the wireless communication network may also be referred to as a campus network. In such locations, certain UEs may have a limited mobility, such as fixed mounted sensors or machine parts, like robots, operating in accordance with a certain movement pattern between different positions. When referring to quasi-stationary entities, as is used in the present disclosure, it is noted that this is not limited to the mobility of a certain entity as mentioned above, rather, it also may refer to a channel stationarity meaning that a communication channel between two entities may be fixed at certain times and may only change with a known pattern or slowly. Thus, the wireless communication network may cover or serve an environment that is characterized by slow and/or foreseeable changes, like slow or known positions at which a movable entity is located. When considering the above-described case of quasi-stationary UEs, even when the UE is at a fixed location at a certain time, the channel property may change, for example, because a channel between the UE and another entity, either another UE or a base station, is at least partially blocked, for example by another device moving between the UE and the base station, so that the UE may select another access point or base station of the wireless communication network for connecting to the wireless communication network.

The entities of the wireless communication network perform respective measurement and sounding procedures. For example, an access point or a base station of the wireless communication network may transmit respective reference signals, RSs, that are measured by a UE, so as to obtain one or more parameters or respective values for one or more parameters on the RS resources. Likewise, also the UE may send the reference signals, like the sounding reference signal, SRS, that is received and measured by the access point or base station so as to derive one or more parameters or parameter values from the measurement on the SRS resources. Using the measurements, the respective entities may determine the communication conditions and channel conditions so that, for example, by means of measurement reports, respective transmission parameters may be adapted to certain conditions of the channel derived from the measured parameters.

However, currently known channel measurement and sounding procedures are designed to be used in any kind of scenario, i.e., also in scenarios in which a mobile device moves quickly or the channel properties change often so that a quasi-stationary entity performs and reports measurements too frequently. In other words, in a scenario as described above, an entity needs to perform a measurement and to report a measurement actually only in cases or situations when the position of the entity changed and/or when a change of a channel property is experienced. Since the scenario is a quasi-stationary scenario, the number of measurements needed may be significantly lower than in non-stationary environments in which a position and/or a channel property may change more often and more quickly. Stated differently, the measurement and sounding procedures are conventionally designed for all possible scenarios, so that also in a quasi-stationary scenario, the same number of measurements and associated sending of reports is carried out as in a non-stationary scenario. Thus, when employing a conventional measurement and sounding procedure in a quasi-stationary scenario a substantial amount of unnecessary measurements at the entity and transmission of reports is generated leading, at the entity to an increased power consumption and also the need for providing a certain degree of complexity, like signal processing capabilities, at the entity. Also, over the radio interface the signaling is increased, i.e., a signaling overhead is created. To reduce the signaling overhead and the power consumption, especially in cases in which battery powered devices are used, less frequent channel measurements and associated reports are desired so that, for example, a batter lifetime of an entity in the network may be enhanced and/or the required complexity of an entity or device may be reduced.

5G provides a framework for beam management to support serving a UE by different beams at the same time. For example, each PDSCH (downlink, DL, data) is associated with a transmission configuration indicator, TCI, state which establishes a quasi co-location relationship between one or more downlink reference symbols and the DM-RS ports of the PDSCH. FIG. 2 illustrates a RRC configuration information element, IE, for configuring a TCI state at a UE. The quasi co-location type, QCL type, is defined in TS 38.214, chapter 1.5.5 "Antenna Ports Quasi-Co-Location", as follows:

"The UE can be configured with a list of up to M TCI-State configurations within the higher layer parameter PDSCH-Config to decode PDSCH according to a detected PDCCH with DCI intended for the UE and the given serving cell, where M depends on the UE capabilitymaxNumberConfiguredTCIstatesPerCC.

Each TCI-State contains parameters for configuring a quasi co-location relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA'. {Doppler shift, Doppler spread, average delay, delay spread}
'QCL-TypeB'. {Doppler shift, Doppler spread}
'QCL-TypeC': {Doppler shift, average delay}
'QCL-TypeD'. {Spatial Rx parameter}"

For example, a base station may configure the QCL relationship using higher layer signaling, and a UE may be configured with up to 64 TCI states to receive a PDCCH. Each TCI state includes parameters on RS resources and the QCL relationship between the RSs and the DRMS ports of the PDCCH with respect to the QCL-type. The QCL allows the UE to employ one or more parameters obtained by a measurement of the reference signal when decoding the PDSCH, thereby avoiding the UE to determine or calculate the respective parameters for both the reference symbols and the DM-RS ports of the PDSCH.

As mentioned, the TCI framework is conventionally used for the beam management to support serving a UE by different beams, but it has been found by the inventors of the present invention that the TCI framework may be employed also in the above-described quasi-stationary use cases or scenarios and allows for overcoming the drawbacks, especially the need for frequently performing and reporting measurements of the channel conditions when transmitting or receiving a transmission. In accordance with the inventive approach, the reference signals employed within the wireless communication network are associated with respective TCI states and provided by a network entity, like a gNB. A user device, like a UE, may perform measurements of a reference signal so as to obtain respective parameters that may be used when transmitting or receiving a transmission that has associated therewith a corresponding TCI state, e.g., to or from a gNB or another UE. For example, the TCI state or sub-TCI state may be indicated with the scheduling assignment/grant for the transmission. In accordance with the inventive approach, the UE, responsive to a certain event resets the parameters obtained by a measurement associated with the TCI state of one or more of the reference signals. The UE may continue the measurement and associate the measurement with a new active TCI state or a new active sub-TCI state.

The network entity, like the gNB, may be aware of the quasi-stationary scenario, for example, of a certain position or constellation of objects in the environment, like a fabrication hall, within which the UE is located. The gNB may be aware of a mobility pattern of the UE, so that the gNB is aware of situations in which a channel state or channel profile of a channel between the UE and the gNB changes. For example, a particular channel profile or channel state may be associated with a particular channel propagation characteristic that is due to a particular position a UE currently has within an environment or a particular constellation of objects in the environment. For example, the channel state or channel profile may change because the UE moved from a first position to a second position, or because a device including the UE changes its position, like a robot moving from a first posture to a second posture, or because an obstacle moved into the way between the UE and the gNB. In the first two cases, the gNB may be aware of the behavior of the UE, and in the last case, the gNB may determine a deterioration of the channel state and signal to another gNB to serve the UE because of a better channel condition between the other gNB and the UE. In either case, the UE receives from the gNB a signaling indicating that the parameters obtained by the measurements of one or more reference signals associated with the respective TCI states are to be reset. The UE performs new measurements of the one or more reference signals to obtain the parameters which are associated with the current channel profile or channel state of the channel between the gNB and the UE. In other words, measurements associated with a channel profile that no longer applies are not taken into consideration for determining the parameters to be used for transmitting/receiving a transmission thereby allowing for a reliable transmission. For example, by making use of the TCI states in the above-described way, it is sufficient for the UE to perform the measurement of the reference signals provided by the base station but a measurement of the other reference signals, like CSI-RS or SRS that may come along with a data transmission, thereby reducing the frequency of measurements needed at the UE.

In accordance with embodiments, each reference signal may be associated with a plurality, i.e., two or more, TCI states, and the UE, when determining the event causing the reset of the parameters obtained by measurements of a particular reference signal, may associate new measurements with a different TCI state of the particular reference signal. In accordance with other embodiments of the invention approach, each TCI state of a particular reference signal may be associated with a certain channel condition or channel state of the channel between the UE and the network entity, and the UE, may associate a certain measurement for a certain channel condition with the TCI state associated with this specific channel condition.

In accordance with other embodiments, each TCI state of a particular reference signal may be associated with a plurality, i.e., two or more, sub-TCI states, and the UE, when determining the event causing the reset of the parameters obtained by measurements, may associate new measurements with a different sub-TCI state. In accordance with further embodiments of the invention approach, each sub-TCI state may be associated with a certain channel condition or channel state of the channel between the UE and the network entity, and the UE may associate a certain measurement for a certain channel condition with the sub-TCI state associated with this specific channel condition.

Figure 3:
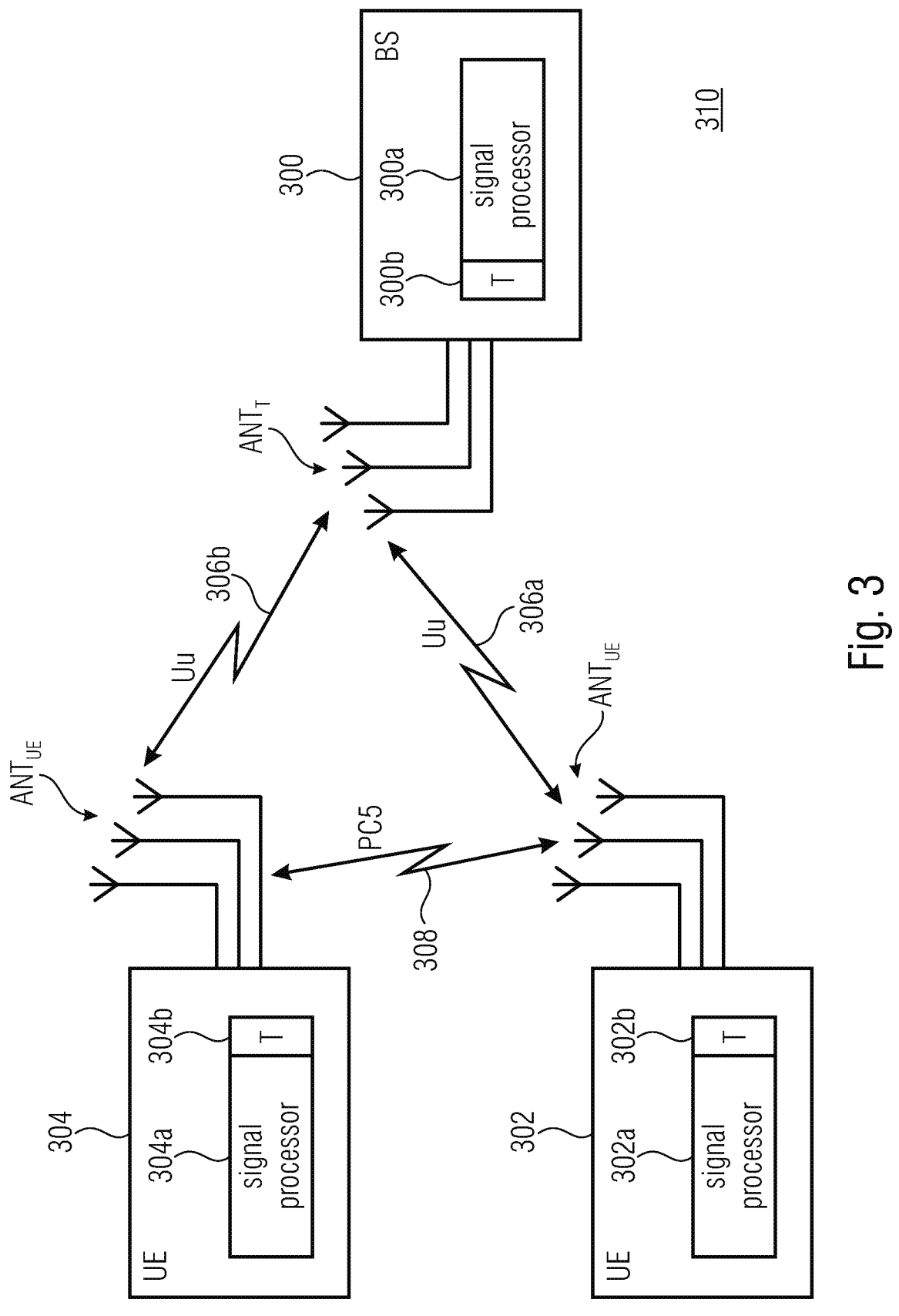
FIG. 3 is a schematic representation of a wireless communication system including a transmitter, like a base station, one or more receivers, like user devices, UEs, and one or more relay UEs for implementing embodiments of the present invention.

Embodiments of the present invention may be implemented in a wireless communication system as depicted in FIG. 1 including base stations and users, like mobile terminals or IoT devices. FIG. 3 is a schematic representation of a wireless communication system including a transmitter 300, like a base station or gNB, one or more user devices, UEs, 302, 304 and one or more relaying entities 306, 308 and 310, like relay UEs, for implementing embodiments of the present invention. The transmitter 300 and the receivers 302, 304 may communicate via the respective relaying entities 306, 308, 310 using respective wireless communication links or channels 310a, 310b, 312a, 312b and 314a, 314b, like respective radio links. The transmitter 300 may include one or more antennas $ANT_T$ or an antenna array having a plurality of antenna elements, a signal processor 300a and a transceiver 300b, coupled with each other. The receivers 302, 304 include one or more antennas $ANT_{UE}$ or an antenna array having a plurality of antennas, a signal processor 302a, 304a, and a transceiver 302b, 304b coupled with each other. Each of the relaying entities 306, 308, 310 includes one or more antennas ANT or an antenna array having a plurality of antennas, a signal processor, and a transceiver T coupled with each other. The base station 300 and the UE 302 may communicate via the relaying entity 310 using the wireless communication link 314b, like a radio link using the Uu interface or another 3GPP or non-3GPP interface, between the base station 300 and the relaying entity 310, and using the wireless communication link 314a, like a radio link using the PC5/sidelink, SL, interface, between the UE 302 and the relaying entity 310. Likewise, the base station 300 and the UE 304 may communicate via the relaying entity 308 using the wireless communication link 312b, like a radio link using the Uu interface, between the base station 300 and the relaying entity 308, and using the wireless communication link 312a, like a radio link using the SL interface, between the UE 304 and the relaying entity 308. The UEs 302, 304 may communicate with each other via the relaying entity 306 using the wireless communication link 310a, like a radio link using the SL interface, between the UE 302 and the relaying entity 306, and using the wireless communication link 310b, like a radio link using the SL interface, between the UE 304 and the relaying entity 310. Any one of the system or network, the one or more UEs 302, 304, the one or more relaying entities

306-310 and/or the base station 300, as illustrated in FIG. 3, may operate in accordance with the inventive teachings described herein. In the following description, the relaying entity is referred to as relay UE.

User Device—Resetting Measurement Responsive to Event

The present invention provides a user device, UE, for a wireless communication network, wherein the UE is to perform measurements of one or more reference signals received from a network entity of the wireless communication network, each reference signal being associated with a TCI state, for transmitting or receiving a transmission associated with a certain TCI state, the UE is to use one or more parameters obtained by the measurement of the reference signal being associated with the certain TCI state of the transmission, and responsive to a certain event, the UE is to reset parameters obtained by a measurement associated with the TCI state of at least one of the one or more reference signals.

In accordance with embodiments, the certain event comprises one or more of the following:

an indication from the network entity, like a signaling, a change from a current location at which the UE is located to a new location, like a location at which the UE is stationary so that a channel state of a channel between the UE and the network entity changes from time to time and remains quasi-static otherwise, a time, like a time from which the UE is stationary for a certain duration so that a channel state of a channel between the UE and the network entity changes from time to time and remains quasi-static otherwise, a change of an environment in which the UE is located, like a change between different constellations so that a channel state of a channel between the UE and the network entity changes from time to time and remains quasi-static otherwise, a change of a channel state between the UE and the network entity, like a change to a new channel state that remains quasi-static for a certain period or time.

In accordance with embodiments, a TCI state associated with a reference signal comprises a plurality of sub-TCI states, like two or more sub-TCI states, and the UE is to associate a measurement of a reference signal with a currently active sub-TCI state, the certain event causes a change of the currently active sub-TCI state, and responsive to the certain event, the UE is to reset the parameters obtained by the measurement of the reference signal by continuing the measurement and associating the measurement with a new active sub-TCI state.

In accordance with embodiments, the indication from the network entity comprises a signaling which of the plurality of sub-TCI states is active.

In accordance with embodiments, when resetting the parameters, the UE is to buffer or store the parameters obtained by the measurement of the reference signal.

In accordance with embodiments, the UE is to combine the measured parameters for the new active sub-TCI state with previous parameters obtained by previous measurements for the new active sub TCI-state.

In accordance with embodiments, for transmitting or receiving a transmission associated with the TCI state, the UE is to use one or more parameters obtained by the measurement associated with the currently active sub-TCI state, wherein the sub-TCI state may be indicated with the UL or DL scheduling assignment/grant for the transmission.

In accordance with embodiments, a number of sub-TCI states for each TCI state is configured, e.g., by an RRC configuration, or is pre-configured.

In accordance with embodiments, the UE is to receive from the network entity an explicit signaling, like a sub-TCI field in the DCI, or an implicit signaling, like a BWP indicator which of the plurality of sub-TCI states is active.

In accordance with embodiments, responsive to the certain event, the UE is to cause a change of the sub-TCI state for all TCI states or for a configured or pre-configured set of TCI states or for an explicitly indicated set of TCI states.

In accordance with embodiments, the plurality of sub-TCI states includes a default sub-TCI state, like an initial sub-TCI state of the plurality of sub-TCI states, and responsive to an ambiguity regarding the certain event, like an ambiguity in the signaling of a new active sub-TCI state or responsive to not receiving a signaling of a new active sub-TCI state, the UE is to reset the parameters obtained by the measurement of the reference signal by continuing the measurement and associating the measurement with the default sub-TCI state.

In accordance with embodiments, the UE is configured or pre-configured with an expiry timer to be used for a currently active sub-TCI state other than the default sub-TCI state, and upon expiration of the expiry timer, the UE is to reset the parameters obtained by the measurement of the reference signal by continuing the measurement and associating the measurement with the default sub-TCI state.

In accordance with embodiments, the UE is to restart the expiry timer when an indication from the network entity indicates that the current sub-TCI state is maintained, for example, by indicating the currently active sub-TCI state.

In accordance with embodiments, the indication from the network entity comprises a bandwidth part, BWP, indicator, like a BWP indicator in a DCI, for signaling a change of a currently active sub-TCI state.

In accordance with embodiments, the UE is configured or preconfigured with a plurality of different BWP configurations, like two or more BWP configurations, the plurality of BWP configurations having the same center frequency and bandwidth, and each BWP configuration is associated with a different TCI state or a different sub-ICI state.

In accordance with embodiments, the UE is configured or preconfigured with a plurality of BWP configurations, like two or more BWP configurations, the plurality of BWP configurations including a first BWP configuration and one or more further BWP configurations, the first BWP configuration defining the BWP to be used by the UE, and the one or more further BWP configurations including only a reference to the first BWP configuration to be copied, or a reference to one or more of the parameters to be copied from the first BWP configuration, and each BWP configuration is associated with a different sub-TCI state.

In accordance with embodiments, one or some or all of the reference signals are associated with a plurality of TCI states, like two or more TCI states, and wherein each of the plurality of sub-TCI states is a TCI state associated with a reference signal.

In accordance with embodiments, one or some or all of the reference signals are associated with a plurality of TCI states, like two or more TCI states, and the UE is to associate a measurement of a reference signal with a currently active TCI state, the certain event causes a change of the currently active TCI state, and responsive to the certain event, the UE is to reset the parameters obtained by the measurement of the reference signal by continuing the measurement and associating the measurement with the new active TCI state.

In accordance with embodiments, responsive to the certain event, the UE is to reset the parameters obtained by a measurement by discarding the measurement and starting a new measurement.

In accordance with embodiments, the UE is to receive from the network entity an explicit signaling, like a sub-TCI field in the DCI, or an implicit signaling, like a BWP indicator, to reset the parameters obtained by a measurement.

In accordance with embodiments, the signaling indicates that one or more or all of the TCI state are to be reset.

User Device—Resetting Measurement Responsive to Location Change

The present invention provides a user device, UE, for a wireless communication network, wherein the UE is to perform measurements of one or more reference signals received from a network entity of the wireless communication network, one or some or all of the reference signals being associated with a plurality of TCI states, like two or more TCI states, for transmitting or receiving a transmission associated with a certain TCI state, the UE is to use one or more parameters obtained by the measurement of the reference signal being associated with the certain TCI state of the transmission, wherein each TCI state of a certain reference signal is associated with a certain channel state of a channel between the UE and the network entity, and wherein the UE is to associate a measurement for a certain channel state with the TCI state of the certain reference signal associated with the certain channel state.

The present invention provides a user device, UE, for a wireless communication network, wherein the UE is to perform measurements of one or more reference signals received from a network entity of the wireless communication network, each reference signal being associated with a TCI state, for transmitting or receiving a transmission associated with a certain TCI state, the UE is to use one or more parameters obtained by the measurement of the reference signal being associated with the certain TCI state of the transmission, wherein the UE is configured with a plurality of sub-TCI states, each sub-TCI state being associated with a certain channel state of a channel between the UE and the network entity, and wherein the UE is to associate a measurement for a certain channel state with the sub-TCI state associated with the certain channel state.

In accordance with embodiments, responsive to a change of the channel state, the UE is to continue the measurement and associate the measurement with the TCI state or sub-TCI state associated with the new channel state.

In accordance with embodiments, responsive to a change of the channel state, the UE is to combine the measurement with a previous measurement associated with the new channel state.

In accordance with embodiments, the plurality of TCI states or sub-TCI states comprises one or more particular TCI states or sub-TCI states being associated with a channel state, and during a transition phase for transitioning between two channel states, the UE is to continue the measurement and associate the measurement during the transition phase with one of the particular TCI states or sub-TCI states.

All User Devices

In accordance with embodiments, the UE is to move between a plurality of different locations at which the UE is stationary or an environment of the UE changes between different constellations so that a channel state of a channel between the UE and the network entity changes from time to time and remains quasi-static otherwise, and the UE is to signal to the network entity information about its stationarity or a certain constellation for allowing the network entity to configure the UE.

In accordance with embodiments, the UE is to determine its stationarity or the certain constellation, e.g., from one or more measurements in the past or from preconfigured information in an application.

In accordance with embodiments, the UE is to signal one or more of the following parameters using an information element, IE, like a UEAssistanceInformation IE:

Quasi-static: an index value describing that the using different TCI states or sub-TCI states for one reference signal measurement is enabled or disabled.

Stationarity-Index or stationarity status: an index value describing how static the UE or channel is, like fixed, slow moving, or the like.

Time-in-current-status: the time that the UE already spent in the indicated stationarity status, e.g. how long was the UE stationary, or how long was it in slow-moving status.

Stationarity-Pattern: a periodicity, duration or pattern of stationarity, e.g., that UE or channel moves in regular intervals, or stationarity is interpreted as a channel stationarity, e.g., the UE reports how frequent/with what pattern the channel changes over time.

Stationarity-Timer: remaining time for which the UE is expected to stay in the indicated stationarity status, e.g., a charging time of an electric car or a robot vacuum cleaner.

In accordance with embodiments, the UE is to signal one or more of the following parameters using a measurement report, like a UEMeasurementReport:

Stationarity-Index or stationarity status: an index value describing how static the UE or channel is, like fixed, slow moving, or the like.

Time-in-current-status: the time that the UE already spent in the indicated stationarity status, e.g. how long was the UE stationary, or how long was it in slow-moving status.

Stationarity-Pattern: a periodicity, duration or pattern of stationarity, e.g., that UE moves in regular intervals, or stationarity is interpreted as a channel stationarity, e.g., the UE reports how frequent/with what pattern the channel changes over time.

Stationarity-Timer: remaining time for which the UE or channel is expected to stay in the indicated stationarity status, e.g., a charging time of an electric car or a robot vacuum cleaner.

Channel-Fluctuation-Interval: the UE reports an index which is associated with a channel-fluctuation-interval which describes the thresholds in which the channel fluctuation is expected to stay during the stationary period.

In accordance with embodiments, the UE is to send the information element or the measurement report on a periodic basis, on request, e.g. a request received from the transmitting entity, or trigger-based.

In accordance with embodiments, the trigger is based on one or more of the following criteria:

a change of channel state, e.g., a change of one or more channel properties exceeds a certain threshold.

a change of one or more parameters in the measurement report exceeds a certain threshold.

a trigger by the application.

In accordance with embodiments, the UE is to measure one or more particular reference signals, like the DMRS, included in a received transmission associated with a certain TCI state or sub-TCI state, and use the measured reference signal for a channel estimation between the UE and the network entity, for one or more further received transmissions associated with the certain TCI state or sub-TCI state, the UE is to use for the channel estimation at least one of the one or more particular reference signals.

In accordance with embodiments, the UE is to transmit one or more particular reference signals, like the DMRS, embedded in each transmission associated with a certain TCI state or sub-TCI state, for one or more further transmissions associated with the certain TCI state or sub-TCI state, the UE is to not transmit at least one of the one or more particular reference signals together with the transmission.

In accordance with embodiments, the user device comprises one or more of the following: a mobile terminal, or a stationary terminal, or a cellular IoT-UE, or a vehicular UE, or a Sidelink UE, or a pedestrian UE, or a group leader (GL) UE, or an IoT or narrowband IoT, NB-IoT, device, or wearable device, like a smartwatch, or a fitness tracker, or smart glasses, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

Network Entity

The present invention provides a network entity for a wireless communication network, wherein the network entity is to transmit one or more reference signals, each reference signal being associated with a TCI state, a transmission to or from a user device, UE, of the wireless communication network is associated with a TCI state associated with one of the reference signals, and the network entity is to transmit an indication to the UE for causing the UE to reset the parameters obtained by a measurement associated with the TCI state of at least one of the one or more reference signals.

The present invention provides a network entity for a wireless communication network, wherein the network entity is to transmit one or more reference signals, one or some or all of the reference signals being associated with one or more TCI states, a transmission to or from a user device, UE, of the wireless communication network is associated with a TCI state associated with one of the reference signals, and the network entity is to configure the UE with a plurality of TCI states for a certain reference signal, each TCI state being associated with a certain channel state of a channel between the network entity and the UE so as to allow the UE to associate a measurement for a certain channel state with the TCI state associated with the certain channel state, or the network entity is to configure the UE with a plurality of sub-TCI states, each sub-TCI state being associated with a certain channel state of a channel between the network entity and the UE so as to allow the UE to associate a measurement for a certain channel state with the sub-TCI state associated with the certain channel state.

In accordance with embodiments, the UE is to move between a plurality of different locations at which the UE is stationary or an environment of the UE changes between different constellations so that a channel state of a channel between the network entity and the UE changes from time to time and remains quasi-static otherwise, and the network entity is to receive from the UE information about the stationarity of the UE or a certain constellation, and to configure the UE.

In accordance with embodiments, the network entity is to receive one or more of the following parameters using an information element, IE, like a UEAssistanceInformation IE:

Quasi-static: an index value describing that the using different TCI states or sub-TCI states for one reference signal measurement is enabled or disabled.

Stationarity-Index or stationarity status: an index value describing how static the UE or its channel is, like fixed, slow moving, or the like.

Time-in-current-status: the time that the UE already spent in the indicated stationarity status, e.g. how long was the UE stationary, or how long was it in slow-moving status.

Stationarity-Pattern: a periodicity, duration or pattern of stationarity, e.g., that UE moves in regular intervals, or stationarity is interpreted as a channel stationarity, e.g., the UE reports how frequent/with what pattern the channel changes over time.

Stationarity-Timer: remaining time for which the UE is expected to stay in the indicated stationarity status, e.g., a charging time of an electric car or a robot vacuum cleaner.

In accordance with embodiments, the network entity is to receive one or more of the following parameters using a measurement report, like a UEMeasurementReport:

Stationarity-Index or stationarity status: an index value describing how static the UE or its channel is, like fixed, slow moving, or the like.

Time-in-current-status: the time that the UE already spent in the indicated stationarity status, e.g. how long was the UE stationary, or how long was it in slow-moving status.

Stationarity-Pattern: a periodicity, duration or pattern of stationarity, e.g., that UE moves in regular intervals, or stationarity is interpreted as a channel stationarity, e.g., the UE reports how frequent/with what pattern the channel changes over time.

Stationarity-Timer: remaining time for which the UE is expected to stay in the indicated stationarity status, e.g., a charging time of an electric car or a robot vacuum cleaner.

Channel-Fluctuation-Interval: the UE reports an index which is associated with a channel-fluctuation-interval which describes the thresholds in which the channel fluctuation is expected to stay during the stationary period.

In accordance with embodiments, the network entity is to request from the UE the information element or the measurement report.

In accordance with embodiments, the UE is a user device, UE, according to the present invention.

In accordance with embodiments, the network entity comprises one or more of the following: a macro cell base station, or a small cell base station, or a central unit of a base station, or a distributed unit of a base station, or a road side unit (RSU), or a remote radio head, or any transmission/reception point, TRP, enabling an item or a device to communicate using the wireless communication network, the item or device being provided with network connectivity to communicate using the wireless communication network.

Network

The present invention provides a wireless communication network, comprising one or more of the inventive user devices, and/or one or more of the inventive network entities.

Methods

The present invention provides a method for operating a user device, UE, for a wireless communication network, the method comprising:

performing measurements of one or more reference signals received from a network entity of the wireless communication network, each reference signal being associated with a ICI state, for transmitting or receiving a transmission associated with a certain TCI state, using one or more parameters obtained by the measurement of the reference signal being associated with the certain TCI state of the transmission, and responsive to a certain event, resetting parameters obtained by a measurement associated with the TCI state of at least one of the one or more reference signals.

The present invention provides a method for operating a user device, UE, for a wireless communication network, the method comprising:

performing measurements of one or more reference signals received from a network entity of the wireless communication network, one or some or all of the reference signals being associated with a plurality of TCI states, like two or more TCI states, for transmitting or receiving a transmission associated with a certain TCI state, using one or more parameters obtained by the measurement of the reference signal being associated with the certain TCI state of the transmission, wherein each TCI state of a certain reference signal is associated with a certain channel state of a channel between the UE and the network entity, and associating a measurement for a certain channel state with the TCI state of the certain reference signal associated with the certain channel state.

The present invention provides a method for operating a user device, UE, for a wireless communication network, the method comprising:

performing measurements of one or more reference signals received from a network entity of the wireless communication network, each reference signal being associated with a TCI state, for transmitting or receiving a transmission associated with a certain TCI state, using one or more parameters obtained by the measurement of the reference signal being associated with the certain TCI state of the transmission, wherein the UE is configured with a plurality of sub-TCI states, each sub-TCI state being associated with a certain channel state of a channel between the UE and the network entity, and associating associate a measurement for a certain channel state with the sub-TCI state associated with the certain channel state.

The present invention provides a method for operating a network entity for a wireless communication network, the method comprising:

transmitting one or more reference signals, each reference signal being associated with a TCI state, associating a transmission to or from a user device, UE, of the wireless communication network with a TCI state associated with one of the reference signals, and transmitting an indication to the UE for causing the UE to reset the parameters obtained by a measurement associated with the TCI state of at least one of the one or more reference signals.

The present invention provides a method for operating a network entity for a wireless communication network, the method comprising:

transmitting one or more reference signals, one or some or all of the reference signals being associated with one or more TCI states, associating a transmission to or from a user device, UE, of the wireless communication network with a TCI state associated with one of the reference signals, and configuring the UE with a plurality of TCI states for a certain reference signal, each TCI state being associated with a certain channel state of a channel between the network entity and the UE so as to allow the UE to associate a measurement for a certain channel state with the TCI state associated with the certain channel state, or configuring the UE with a plurality of sub-TCI states, each sub-TCI state being associated with a certain channel state of a channel between the network entity and the UE so as to allow the UE to associate a measurement for a certain channel state with the sub-TCI state associated with the certain channel state.

Computer Program Product

Embodiments of the first aspect of the present invention provide a computer program product comprising instructions which, when the program is executed by a computer, causes the computer to carry out one or more methods in accordance with the present invention.

Embodiments of the present invention are now described in more detail with reference to a downlink transmission from an access point, like a base station or gNB, to a user device, UE. However, the subsequently described embodiments are equally applicable for an uplink scenario, i.e., for transmission from a user device to an access point, like a base station or gNB. Likewise, the subsequently described embodiments are equally applicable for a sidelink scenario, i.e., for transmission from a user device to another user device.

First Embodiment—UE Receiving an Indication to Reset Measured Parameters

Figure 4:
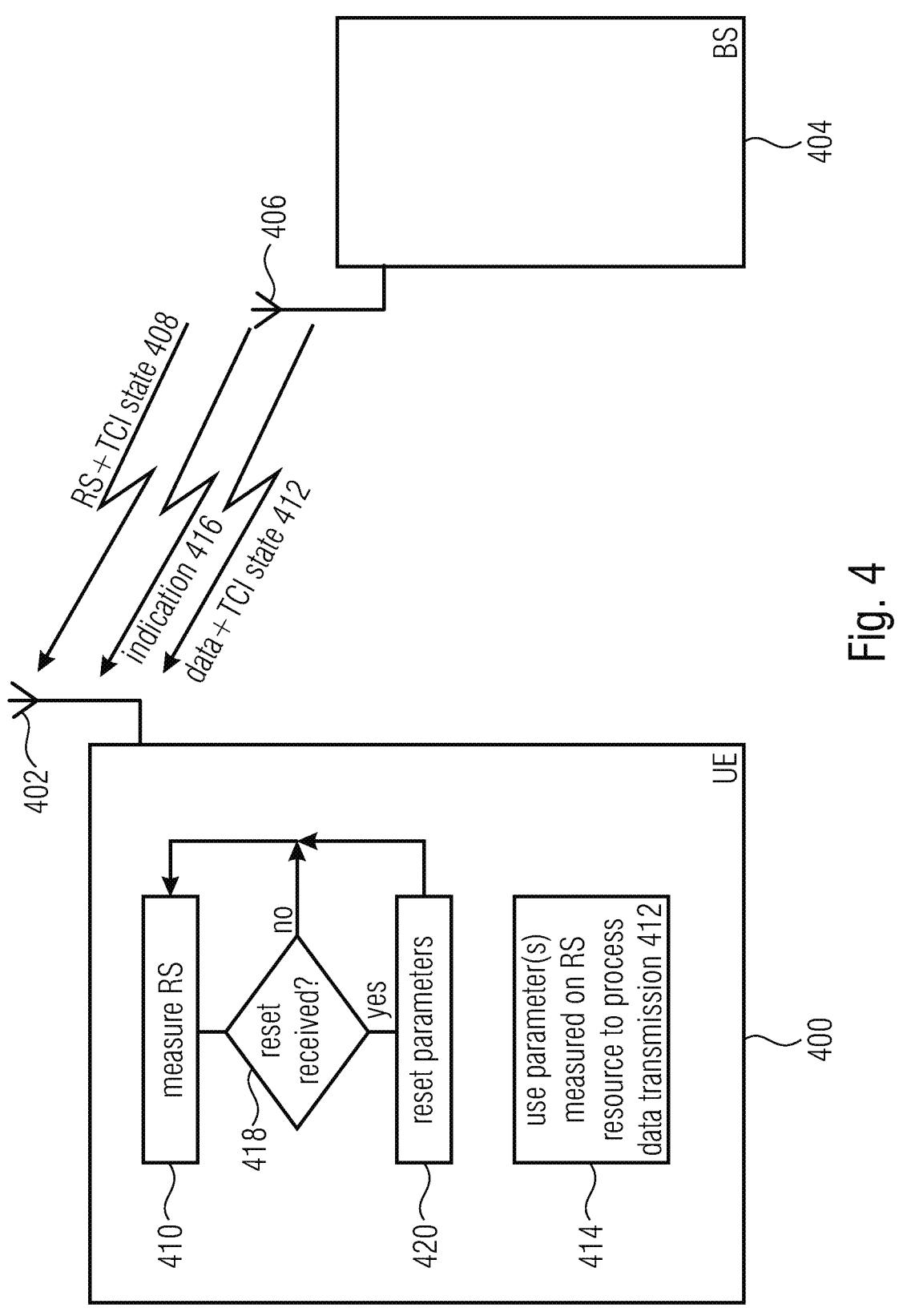
FIG. 4 illustrates a user device, UE, in accordance with an embodiment of the present invention.

FIG. 4 illustrates a user device, UE, or apparatus 400 in accordance with an embodiment of the present invention. The UE may be part of a wireless communication network as described above with reference to FIG. 1. The UE may be a IoT device or a RedCap UE as it may be found in a quasi-stationary scenario. The UE 400, via its antenna 402, communicates with an access point or base station, gNB, 404. The base station, via its antennal 406, transmits reference signals 408. The base station 404 may transmit one or more reference signals 408 each being associated with one or more TCI states. The reference signal 408 is received at the UE 400. The UE 400, as is indicated at 410, measures the reference signal 408 so as to obtain one or more parameters or parameter values associated with the RS resources. Such parameters may include, e.g., a pathloss between transmitter and receiver, phase information, Doppler spread, Doppler shift, delay, spatial receive parameters. The base station 404 may send a data transmission 412, like a PDSSCH, that is associated with a TCI state of the reference signal 408 and when receiving the data transmission 412 associated with the TCI state of the reference signal 408, the UE, as is indicated 414, uses the parameters obtained by the measurement 410 of the reference signal 408 for decoding the data transmission 412 without the need to perform further measurements of reference signals, like the DMRS, of the data transmission 412. For example, the TCI state or sub-TCI state may be indicated with the scheduling assignment/grant for the transmission.

The base station 404 may be aware of the channel profile or channel state between the UE 400 and the base station 404. For example, when considering a quasi-stationary use case, the channel state changes only from time to time and otherwise remains quasi-static. The UE does not need to be aware of any changes of the channel state, however, when the base station 404 determines that the channel state changed, for example because the UE moved from a first known position to a second known position, the base station 404 may send an indication 416 to the UE 400 which causes the UE to reset the parameters obtained by the measurements 410. As is indicated at 418, the UE 400 continues to perform measurements on the received reference signal 408 until the indication 416 is received, and responsive to the indication 416, the UE resets, as is indicated at 420, the parameters measured and continues the measurement 410 so as to obtain new values for the one or more parameters from the measurement. In this way, for decoding 414 a data transmission 412, the UE 400 uses parameters obtained from the measurement of reference signal 408 that are associated with a current channel state between the base station 404 and the UE 400.

Thus, employing the TCI framework in a quasi-stationary scenario may avoid frequent measurements, like frequent measurements of the CSI-RS, SRS or the like. By employing the TCI framework, the data transmission 412 is considered quasi co-located with the transmission of the reference signal 408, and the two transmissions are associated with each other via the TCI state. Thus, without additional measurement, the UE 400 may decode 414 the data transmission using parameters obtained from the measurement of the reference signal 408.

In accordance with embodiments, the UE measures a particular reference signal, like the DMRS included in a certain transmission 412 associated with a certain TCI state or sub-TCI state, and uses the measured reference signal from the transmission 412 for a channel estimation between the UE and the gNB. For one or more further transmissions 412 associated with the same TCI state or sub-TCI state, the UE 400 uses for the channel estimation the same reference signal, i.e., the reference signal, like the DMRS, obtained from the certain transmission. In other words, while conventionally the DMRS is measured per data transmission, in accordance with embodiments, the DMRS may be used jointly over a TCI state or sub-TCI state/duration to estimate the channel.

The present invention, by employing the TCI framework in the above-described way, allows for fast and dynamic adaptions of the measurement framework at the UE in a quasi-stationary scenario without the need for frequent measurements to be performed on the actual data transmission. Further, a faulty combination of reference signals, which have been obtained for different channel characteristics, is avoided since the gNB 404 indicates to the UE 400 to reset the previously done measurements because the channel provocation characteristics or, more generally, the channel state changed. The UE 400 then may start to obtain measurement information from the scratch or by combining buffered previous measurement information with the new measurement information.

With reference to FIG. 4 an embodiment of the present invention is described in which the base station sends the reference signal 408 which is associated with a certain TCI state. In accordance with further embodiments, the base station 404 may send a plurality of reference signals, i.e., two or more reference signals towards the UE 400 that measures the plurality of reference signals for determining respective parameters so that parameters associated with different TCI states are obtained. Responsive to the indication 416, the UE 400 may reset the parameters obtained by the measurements of one, some or all of the reference signals. In accordance with embodiments, the signaling 416 may explicitly or implicitly indicate a single TCI state to be reset, or a set of two or more TCI states to be reset, or all TCI states to be reset.

Multiple Sub-TCI States Per TCI State

In accordance with embodiments of the present invention, each TCI state associated with a reference signal may comprise a plurality of sub-TCI states, i.e., two or more sub-TCI states. In other words, each configured TCI state may include a number of sub-TCI states, and the number of support of sub-TCI states may be a configured or preconfigured number. In accordance with such embodiments, the indication 416 indicates which of the plurality of sub-TCI states associated with a certain TCI state is currently active, and when the UE 400 receives the indication 416 and determines that the currently active sub-TCI state is to be changed, the UE 400 resets the parameters obtained by the measurement of the reference signal, for example, by continuing the measurement of the reference signal 408, but associating the obtained parameters/parameter values or the measurement now with the new active sub-TCI state. In this case, when a data transmission 412 associated with the TCI state or the currently active sub-TCI state is received at the UE 400, at 414, the parameters obtained by the measurement associated with the currently active sub-TCI state are used for decoding the data transmission 412.

In accordance with embodiments, when considering a situation that a sub-TCI state is switched from a first active sub-TCI state to a second active sub-TCI state, the UE may discard or delete the parameters or parameter values obtained by the measurements associated with the first sub-TCI state so that when returning to the first sub-TCI state at a later time, the parameters or parameter values are obtained only on the basis of the new measurements performed when returning to the first sub-TCI state. In accordance with other embodiments, rather than discarding the parameters or parameter values when changing from the first sub-TCI state to the second sub-TCI state, the UE 400 may buffer or store the parameter or parameter values obtained by the measurement during the first sub-TCI state, and, when returning to the first sub-TCI state again at a later time, the buffered or stored parameters/parameter values, also referred to as previous parameters, are used so that the parameter/parameter values are obtained starting from the previous parameters and on the basis of the new measurements made when returning to the first sub-TCI state.

Thus, in accordance with the present embodiment, the gNB 404 may indicate explicitly, for example, by using a sub-TCI field in the DCI, or implicitly, for example, by using a BWP indictor, to the UE 400 which sub-TCI state is currently active. In the active phase of a certain sub-TCI state the UE 400 considers for the reception of the data transmission or PDSCH 412 only reference signals which are associated with the TCI state or the sub-TCI state indicated in the data transmission. Further measurements are only performed for this sub-TCI state. The information or parameters derived from the reference signal is taken from the associated QCL type in the associated TCI state configuration.

In accordance with embodiments, when receiving an indication of a new active sub-TCI state, and when employing a plurality of reference signals being associated with respective TCI states, the sub-TCI state of one, some or all of the reference signals may be changed to a new, active sub-TCI state. Thus, in accordance with embodiments, a change of a sub-TCI state may be applicable to all or only a set of configured TCI states. Stated differently, a single indication to the UE 400 to change a sub-TCI state may cause the UE 400 to change all TCI states or a configured or pre-configured set of TCI states. An advantage of this embodiment is that an explicit indication for each of the sub-TCI states is avoided in case of changes of the environment causing a change in the channel state so that the UE automatically adapts to the new environment situation.

In accordance with embodiments, the plurality of sub-TCI states may include a default sub-TCI state that may be used in case the UE 400 detects an ambiguity or in case an expiry timer passes, so that the UE 400 may fall back to the default sub-TCI state, in case the UE does not receive an indication of a new active sub-TCI state or in case an ambiguity is determined in the indication or in case a currently active sub-TCI state expired without a new sub-TCI state being signaled. For example, in case there is no specific configuration of the default sub-TCI state, among the plurality of configured sub-TCI states, a first or initial sub-TCI state may serve as the default sub-TCI state. In accordance with embodiments, this may be overwritten by a configuration declaring another sub-TCI state the new default sub-TCI state that is different from the initial sub-TCI state or different from a current sub-TCI state.

In accordance with further embodiments of the present invention, a sub-TCI state expiry timer may be defined so that any active sub-TCI state may use an expiry time. When the expiry timer expires, UE 400 may return to the above-described default sub-TCI state and continue performing measurements associated with the default sub-TCI state. In other words, when the UE 400 is in a non-default sub-TCI state, it may run the expiry timer that may be restarted each time by a confirmation from the gNB. For example, the gNB 404 may indicate at certain times that the current sub-TCI state is maintained, for example, by indicating a switch to the currently active sub-TCI state, which confirms that the UE is to stay in this state. In case such a confirmation or switch message is not received during the expiry timer, the UE 400 switches to the default sub-TCI state.

As mentioned above, the change of a sub-TCI state may be signaled by the base station 404 using the signaling or indication 416, and the indication may be either an explicit signaling by including into the signaling a sub-TCI field in a DCI message or it may be an implicit indication using, in accordance with embodiments, a bandwidth part, BWP, indicator. In accordance with such embodiments, the BWP indicator as it may be employed in the DCI, is used to indicate a change of a sub-TCI state. The UE 400 may be configured with a first or UE specific BWP configuration defining the BWP within which the UE is to operate. For indicating a change of sub-TCI states using the BWP indicator, in addition to the first BWP configuration, an additional BWP configuration may be provided, for example, a nearly identical BWP configuration or a copy of the first BWP configuration.

In case of using a nearly identical BWP configuration, the UE is actually configured explicitly with a further BWP, in addition to the first BWP configuration. The further BWP configuration is basically identical to the first BWP configuration, advantageously in terms of center frequency, subcarrier-spacing and bandwidth, while other parameters, like the PDCCH monitoring configuration or PUSCH and PDSCH related configuration, may differ. The first BWP configuration with which the UE is initially configured is associated with a first sub-TCI state, whereas the additional BWP configuration is associated with a second sub-TCI state so that a BWP switch indication in a DCI causes a switching between the first and second sub-TCI states in a way as described above with reference to FIG. 4.

When employing a further BWP configuration that is a copy of the first BWP configuration, the further BWP configuration does not include or carry all information fields of the first BWP configuration but a reference to the first BWP configuration may be included that indicated that all or only some of the parameters of the first BWP configuration are to be copied. A BWP switch indication in a DCI, like in the above-described embodiment, results in a sub-TCI state switch. When employing a copy of the first BWP configuration, the further BWP configuration is not counted for the BWP limit of the UE 400. For example, a UE may only have up to a certain number of independent BWP configurations, like three independent BWP configurations, basically, an unlimited number of further BWP configurations being a copy of the first BWP configuration may be employed. In accordance with other embodiments, the actual number of allowed copied BWP configurations may be limited by other processes.

FIG. 5 schematically illustrates the above concept of using nearly identical or copied BWP configurations for signaling the switch of a sub-TCI state.

FIG. 5(*a*) illustrates with an available bandwidth 450 of a cell within which two bandwidth parts BWP1 and BWP2 are defined, and the UE 400 may be configured, for example, with BWP1.

FIG. 5(*b*) illustrates an example of using a nearly identical further BWP as described above. Again, the bandwidth 450 of the cell is indicated as including the two bandwidth parts BWP1 and BWP2. UE 400 is assumed to be configured with BWP1, which in accordance with the present invention, is associated with a first sub-TCI state. In addition, the bandwidth part BWP3 is defined that overlaps with the first bandwidth part BWP1 and that is associated with a second sub-TCI state. Advantageously, the center frequency of BWP1 and BWP3 are identical, so as to avoid any retuning at the UE side with regard to the BWP3 configuration. When receiving the indicator that the UE is to use BWP3, the UE understands this as also to be an indication to switch from the first sub-TCI state to the second sub-TCI state.

Figures 5A, 5B, 5C:
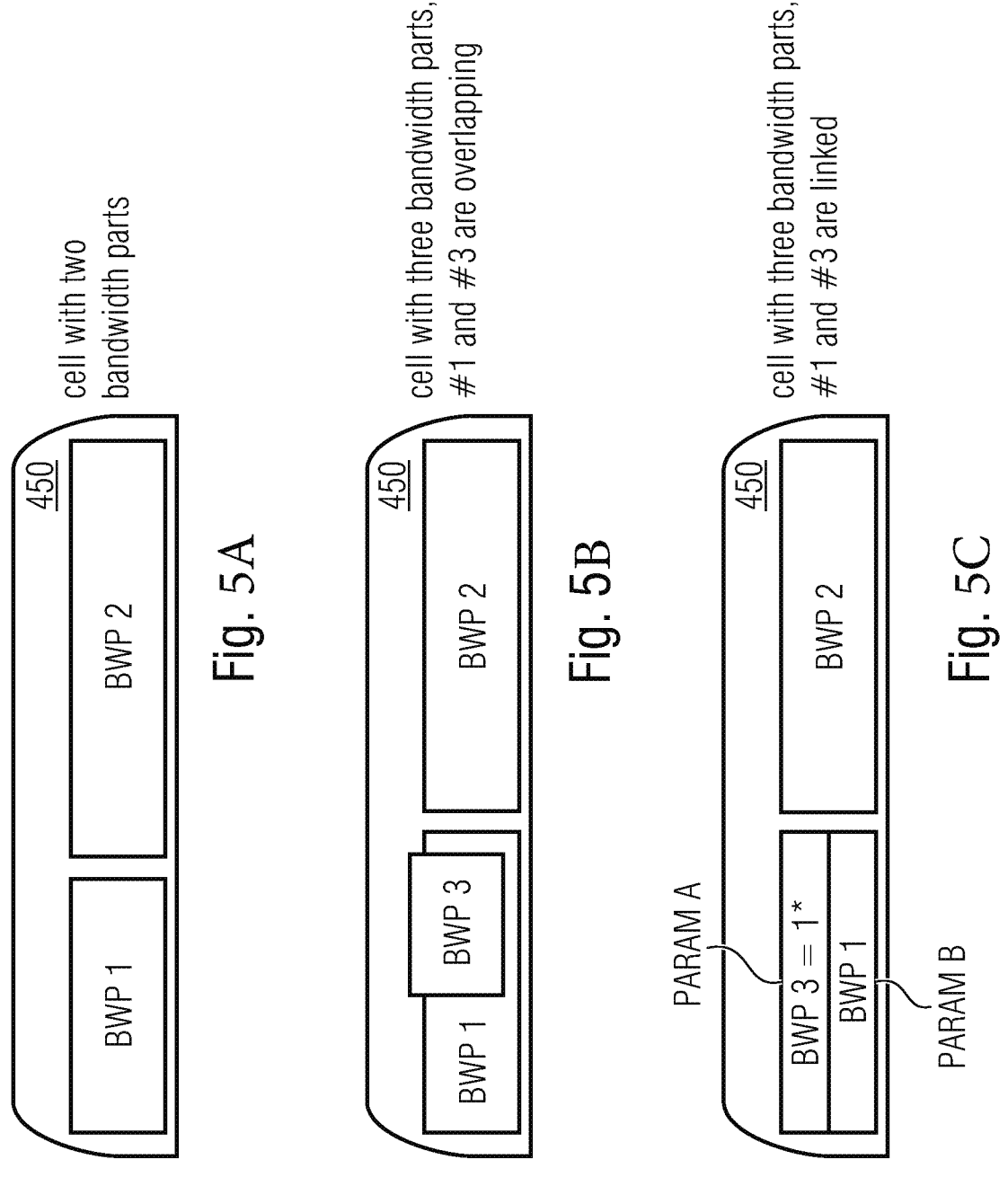
FIG. 5a-c schematically illustrates using nearly identical or copied BWP configurations for signaling a switch of a sub-TCI state in accordance with embodiments of the present invention.

FIG. 5(c) illustrates an embodiment of using a copied BWP. As is illustrated, BWP3 is a configuration indicating that is a copy of BWP1, i.e., BWP3 only includes the indication that BWP1 configuration is to be used or copied so that when receiving the signaling that the BWP3 is to be used, the switching of the sub-TCI state occurs without any other changes as the UE knows from the BWP3 configuration that it is the same as its current BWP configuration BWP1.

A BWP switching, normally, is associated with a switching time needed to retune the RF chain of the UE 400 to the new frequencies of the new BWP, however, in accordance with the present invention, the RF chain needs not to be retuned since the BWPs have the same center frequency so that it is not necessary to apply any switching time to BWP switches from BWP1 to the nearly identical BWP3 or to the copied BWP3.

Multiple TCI States Per Reference Signal

In accordance with the embodiments described above making use of the sub-TCI states, respective measurements or parameters/parameter values may be associated with a currently active sub-TCI state of a reference signal being associated with a TCI state comprising a plurality sub-TCI states. However, the present invention is not limited to the use of such sub-TCI states, rather, in accordance with other embodiments, the same functionality may be achieved by associating a reference signal with a plurality, i.e., with two or more TCI states.

More specifically, in the embodiment of FIG. 4, the reference signal 408 was described to be associated with one or with a single TCI state. However, in accordance with other embodiments, each reference signal provided by the base station 404 may be associated with a plurality of TCI states, i.e., with two or more TCI states. The indication 416 may include a signaling of the TCI state that is currently active for one, some or all of the reference signals provided by the base station 404. In the same way as described above with reference to the embodiments using the sub-TCI states, also in the present embodiment using a plurality of TCI states being associated with each reference signal, when switching from a currently active TCI state of the reference signal to a new active TCI state of the reference signal, the UE 400 may reset the parameters obtained by the measurements so far and start a new measurement associated with a new TCI state for obtaining parameters to be used when receiving a data transmission 412 associated with a currently active TCI state. In other words, the above-described concept of using sub-TCI states may also be implemented by providing one or more new or additional TCI states for the reference signal so that, e.g., a first TCI state is associated with a first sub-TCI state of the reference signal and a second TCI is associated with a second sub-TCI state of the reference signal. Thus, from a signaling perspective, the reference signal is now associated with two or more TCI states so that by means of providing the different TCI states associated with the RS signal, the effects as described above with reference to the sub-TCI states are achieved.

Other Events Causing the Reset

In the embodiments describe above, the event causing the reset of the parameters is an indication from the network entity, like a certain signaling. However, in accordance with other embodiments, different or additional events may cause the reset, like one or more of the following:

a change from a current location at which the UE is located to a new location, like a location at which the UE is stationary so that a channel state of a channel between the UE and the network entity changes from time to time and remains quasi-static otherwise, a time, like a time from which the UE is stationary for a certain duration so that a channel state of a channel between the UE and the network entity changes from time to time and remains quasi-static otherwise, a change of an environment in which the UE is located, like a change between different constellations so that a channel state of a channel between the UE and the network entity changes from time to time and remains quasi-static otherwise, a change of a channel state between the UE and the network entity, like a change to a new channel state that remains quasi-static for a certain period or time.

Second Embodiment—UE Resetting Measured
Parameters Responsive to Changing Channel
Conditions In accordance with further embodiments of the present invention, a UE being located in a quasi-stationary environment may be aware of changing channel conditions or channel states of a channel between the UE and the base station. For example, the UE may move on a predictable track within a certain environment or it may be aware that other objects within the environment move in such a way that the channel state or channel property is effected by the movement of the other device. This information may be known at the gNB which may configure the UE with respective channel conditions so that the UE when experiencing a change of the channel condition, may associate a measurement of reference signals with the new channel condition. When considering the UE to move on a predictable track between two or more static locations, the UE may be configured by the gNB accordingly. Thus, when moving between different location, the UE is aware that this also means that different channel conditions apply, and the UE may associate a measurement for a certain channel condition with a TCI state or sub-TCI state for this channel condition.

In accordance with embodiments, when the UE moves from a first location to a second location and then returns to the first location, the corresponding measurements, on the basis of the TCI state or sub-TCI state associated with the certain location/channel condition, may be combined. Stated differently, the measurements from a previous period associated with the TCI state or sub-TCI state may be combined with the measurements during a current period associated with the same TCI state or same sub-TCI state.

Figure 6:
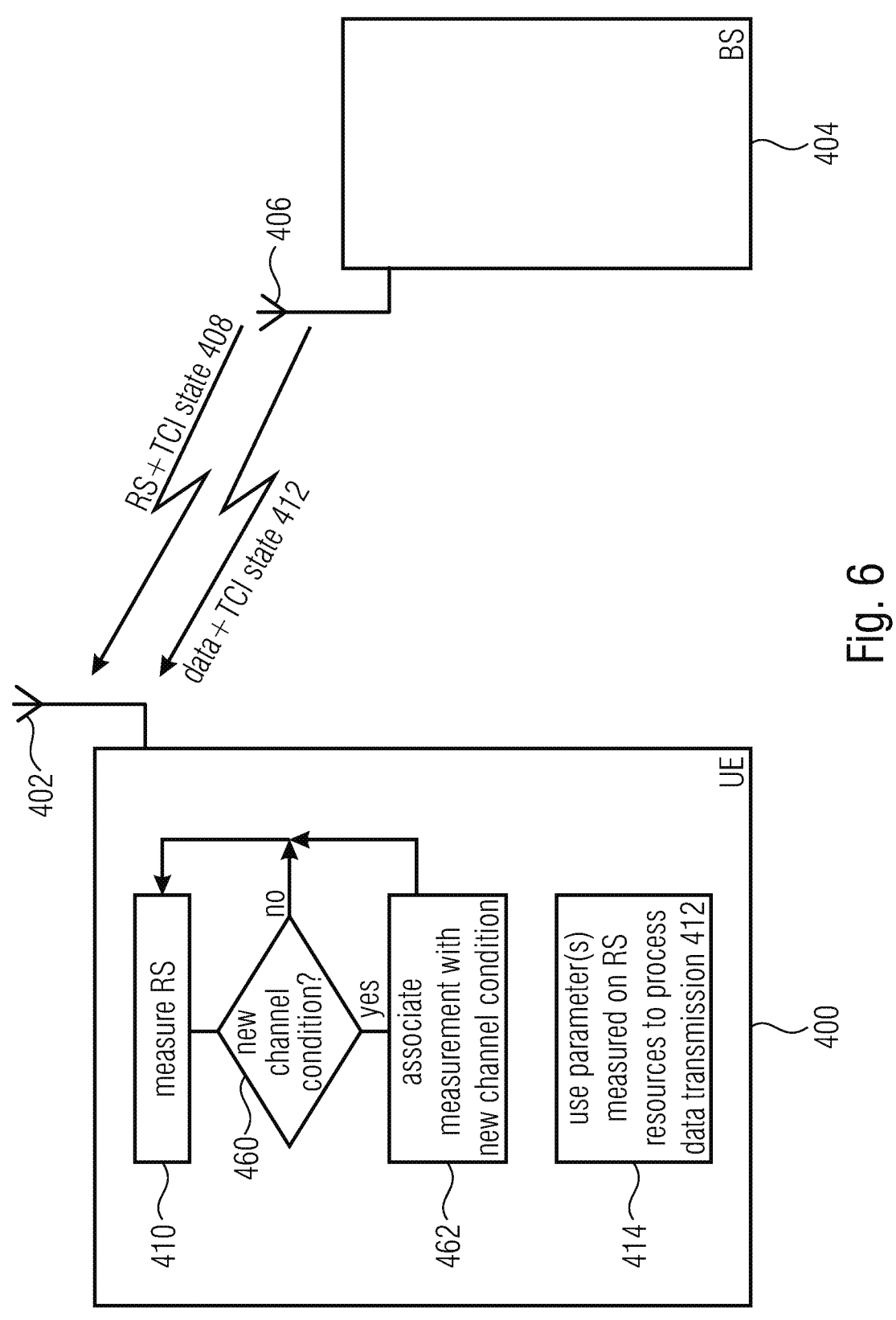
FIG. 6 illustrates a user device, UE, in accordance with a further embodiment of the present invention.

FIG. 6 illustrates a UE 400 in accordance with a further embodiment of the present invention. The UE 400 communicates with a base station 404 which transmits one or more reference signals 408 and also transmits data 412. In accordance with embodiments, each reference signal is associated with the TCI state, and the data transmission 412 is also associated with a TCI state of one of the reference signals. Each TCI state includes a plurality sub-TCI states, and the UE 400 has knowledge about different channel conditions or channel states of the channel between the UE 400 and the base station 404 which are experienced, for example, due to a movement of the UE 400 from a first location to a second location or due to another object moving between the base station and the UE 400. Each of the states of the channel is associated with a certain sub-TCI state. The UE 400, as is indicated at 410, measures the reference signal and associates the measurement with a currently active sub-TCI state which, in turn, is associated with a certain channel condition or channel state currently experienced by the UE 400. For example, when being at a first location, the UE may associate the parameters obtained by a measurement of the reference signal 408 with a first sub-TCI state associated with the reference signal and being associated with the first position or location. When being at a second location, the parameters measured may be associated with a second sub-TCI state associated with the second location.

In accordance with further embodiments, the UE 400 may be aware of the different channel states or channel conditions, for example, it may be aware that at certain time periods the UE itself is located at a first position and at other time periods it is located at a second position and/or that at certain time periods an object is between the base station and the UE and at other times it is not present. The respective time periods are associated with respective different channel conditions which, in turn, are associated with different sub-TCI states. Thus, when the UE determines that it moved to a new location or when a certain time period indicates, on the basis of a movement pattern, that the UE is now located at another location, the UE, as is indicated at 460, determines that a new channel condition applies so that at 462 the measurement now carried out it associated with the new sub-TCI state corresponding to the new location/channel state. In case no change of channel state is detected at 460, the measurement is continued and associated with the currently active sub-TCI state.

In accordance with embodiments, the measurements from previous periods may be discarded or may be combined with the measurements from a current period. For example, a UE is assumed that is arranged on or is implemented within a machine, like a robot or an automated vehicle as used in a fabrication hall, rotating or moving between different locations, like locations #1, #2, #3 and #4. Each location may be configured by the gNB with a TCI state or a sub-TCI state, and in accordance with embodiments of the present invention, the UE associates a measurement at a certain location with the corresponding TCI state/sub-TCI state and each time the UE is at a certain location, the previous measurements and the new measurements are combined.

In accordance with other embodiments, in a similar way as described above with reference to FIG. 4, rather than employing a plurality of sub-TCI states associated with a TCI state for a certain reference signal, the reference signal 408 or some or all of the reference signals provided by the base station may each be associated with a plurality of TCI states, and then, in a similar way as described above with reference to the sub-TCI states, the UE 400 having knowledge about the changing channel properties, may associate each channel property with a certain TCI state for a certain reference signal. When switching between channel condition occurs, like changes of locations at which the UE is located, measurements may be associated with different TCI states that are associated to a single reference signal 408.

In accordance with embodiments, the gNB may configure the UE with sub-TCI durations and a transition phase between sub-TCI state switches. The UE may determine autonomously which sub-TCI state fits better during the transition phase, i.e., whether the currently active TCI state or sub-TCI state is to be employed until the transition phase is completed or whether with the start of the transition phase or at some time during the transition phase the newly active TCI state or sub-TCI state is to be used. For example, the UE may decide based on measurements of RS during the transition phase whether they fit better for the currently active or the newly active sub-TCI state and combine them accordingly.

Third Embodiment—UE Signaling of Stationarity/Constellation

The UE 400 may be aware of its stationarity, for example from measurements in the past or from pre-configured information in an application running on the UE or the like. In other words, the UE may be aware that it moves between different locations at which it is stationary so that the channel state changes from time to time but remains quasi-static otherwise, i.e., during the transition from a first location to a second location a channel state changes while it remains substantially unchanged or static when being at the location, at least with regard to some of the channel properties. Also, an environment of the UE may change between different constellations while the UE remains stationary, e.g., in case a factory robot or a conveyer belt nearby move between the UE and the gNB.

In accordance with further embodiments of the present invention, a UE being aware of its quasi-stationarity and/or a specific constellation may signal to the base station information about its stationarity and/or the specific constellation so as to allow the base station to configure the UE accordingly, namely to configure the use of the TCI states or sub-TCI states in a way as described above with reference to the preceding embodiments.

In accordance with embodiments, the UE may signal one or more of the following parameters using an information element, IE, like a UE assistance information IE:
- Quasi-static: an index value describing that the using different TCI states or sub TCI states for one reference signal measurement is enabled or disabled.
- Stationarity-Index or stationarity status: an index value describing how static the apparatus is, like fixed, slow moving, or the like.
- Time-in-current-status: the time that the apparatus already spent in the indicated stationarity status, e.g. how long was the apparatus stationary, or how long was it in slow-moving status.
- Stationarity-Pattern: a periodicity, duration or pattern of stationarity, e.g., that apparatus moves in regular intervals, or stationarity is interpreted as a channel stationarity, e.g., the apparatus reports how frequent/with what pattern the channel changes over time.
- Stationarity-Timer: remaining time for which the apparatus is expected to stay in the indicated stationarity status, e.g., a charging time of an electric car or a robot vacuum cleaner.

In accordance with other embodiments, the UE may signal one or more of the following parameters using measurement report, like the UE measurement report:
- Stationarity-Index or stationarity status: an index value describing how static the apparatus is, like fixed, slow moving, or the like.

Time-in-current-status: the time that the apparatus already spent in the indicated stationarity status, e.g. how long was the apparatus stationary, or how long was it in slow-moving status.

Stationarity-Pattern: a periodicity, duration or pattern of stationarity, e.g., that apparatus moves in regular intervals, or stationarity is interpreted as a channel stationarity, e.g., the apparatus reports how frequent/with what pattern the channel changes over time.

Stationarity-Timer: remaining time for which the apparatus is expected to stay in the indicated stationarity status, e.g., a charging time of an electric car or a robot vacuum cleaner.

Channel-Fluctuation-Interval: the apparatus reports an index which is associated with a channel-fluctuation-interval which describes the thresholds in which the channel fluctuation is expected to stay during the stationary period.

The information either provided in the measurement report or in the information element may be obtained by an application running on the UE that has knowledge how the UE behaves and that passes this information to a lower layer so that the information may be reported to the base station or network. In accordance with other embodiments, the UE may obtain the parameters by performing respective measurements, for example by measuring a received signal strength from the connected cell and/or from neighboring cells.

The information element or the measurement report may be sent on a periodic basis, responsive to a request from, for example, the base station, or it may be sent trigger-based, for example when a change of the channel state is detected, like a change of one or more channel properties exceeding a certain threshold or changing from one known channel state to another known channel state that is described by one or more of the channel properties which are different. In accordance with other embodiments, the sending of the information may be triggered when one or more parameters in a measurement report exceed a certain threshold or when an application triggers the sending of the information.

General

Although the respective aspects and embodiments of the inventive approach have been described separately, it is noted that each of the aspects/embodiments may be implemented independent from the other, or some or all of the aspects/embodiments may be combined.

In the above embodiments, the inventive concept has been described with reference to an downlink, DL, scenario for transmitting data originating at the RAN, i.e., the network entity may be a gNB. However, the present invention is not limited to the above DL scenario but is equally applicable to an uplink, UL, scenario for transmitting data originating at the UE. The UE measures the reference signals associated with the one or more TCI states or with the one or more sub-TCI states and uses the parameters for the data transmission by the UE.

In accordance with yet other embodiments, the inventive concept may also be used in a sidelink, SL, scenario. For example, a first UE receives and measures references signals send by a second UE that may be configured by a gNB or that may be pre-configured to send the reference signals and to associate them with respective TCI states or sub-TCI states to be used by the first UE in the above described way. The second UE may signal the reset to the first UE. In accordance with other embodiments, the wireless communication system may be configured such that a gNB provides the reference signals associated with the respective TCI states or sub-TCI states and provides for the reset. The first UE receives the reference signals from a gNB and, for transmitting/receiving a transmission to/from the second UE, the parameters obtained by measuring the reference signals are used.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments of the present invention, a user device comprises one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and requiring input from a gateway node at periodic intervals, a mobile terminal, or a stationary terminal, or a cellular IoT-UE, or a vehicular UE, or a vehicular group leader (GL) UE, or a sidelink relay, or an IoT or narrowband IoT, NB-IoT, device, or wearable device, like a smartwatch, or a fitness tracker, or smart glasses, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

In accordance with embodiments of the present invention, a RAN network entity, like the gNB, comprises one or more of the following: a macro cell base station, or a small cell base station, or a central unit of a base station, or a distributed unit of a base station, or a road side unit (RSU), or a remote radio head, or an AMF, or an MME, or an SMF, or a core network entity, or mobile edge computing (MEC) entity, or a network slice as in the NR or core context, or any transmission/reception point, TRP, enabling an item or a device to communicate using the wireless communication network, the item or device being provided with network connectivity to communicate using the wireless communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 7:
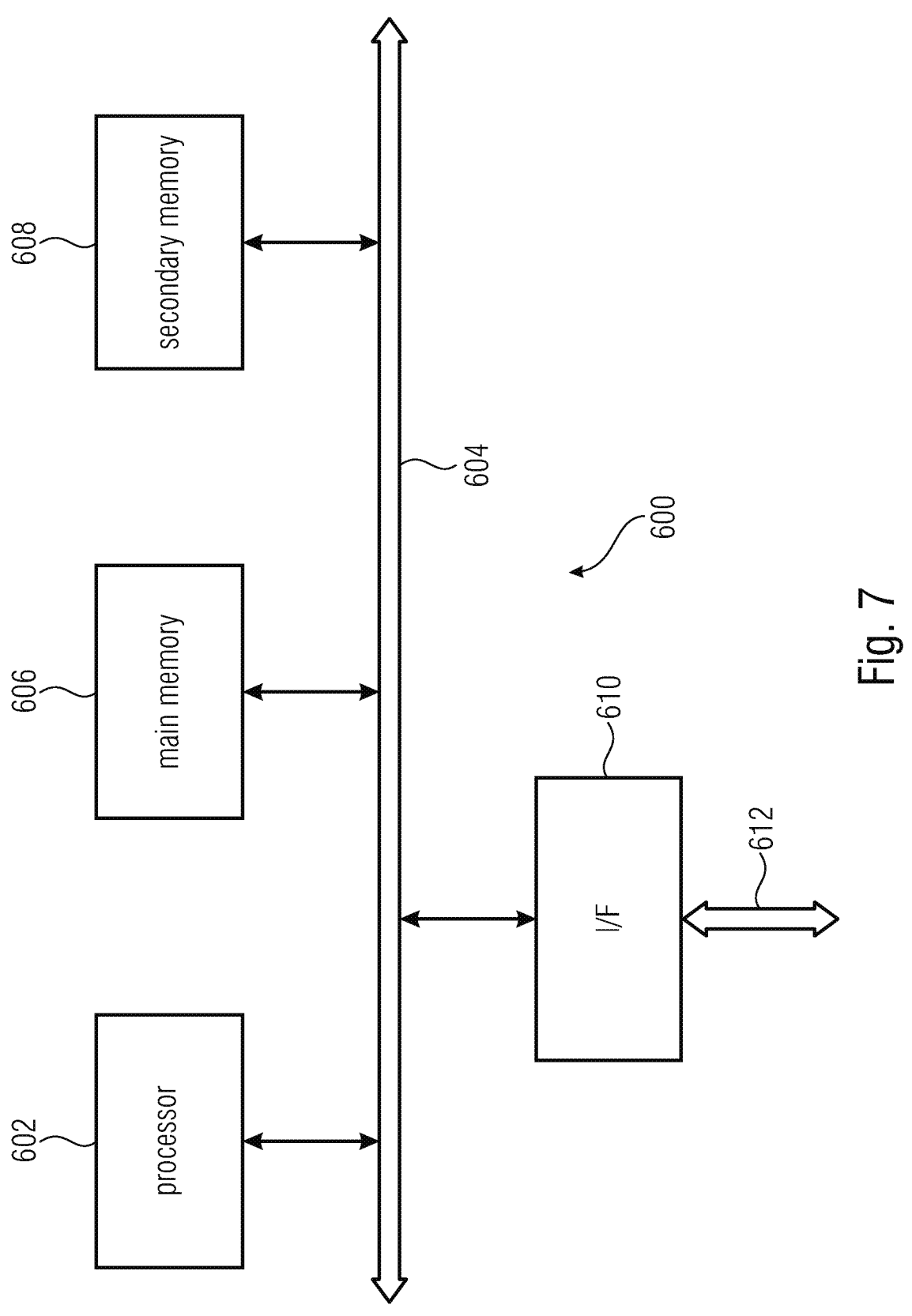
FIG. 7 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 7 illustrates an example of a computer system 600. The units or modules as well as the steps of the methods performed by these units may execute on one or more computer systems 600. The computer system 600 includes one or more processors 602, like a special purpose or a general-purpose digital signal processor. The processor 602 is connected to a communication infrastructure 604, like a bus or a network. The computer system 600 includes a main memory 606, e.g., a random-access memory, RAM, and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein.

The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A user device, UE, for a wireless communication network, wherein the UE is to perform measurements of one or more reference signals received from a network entity of the wireless communication network, each reference signal being associated with a transmission configuration indication (TCI) state, for transmitting or receiving a transmission associated with a certain TCI state, the UE is to use one or more parameters acquired by the measurement of the reference signal being associated with the certain TCI state of the transmission, after an indication from the network entity, the UE is to reset parameters acquired by a measurement associated with the TCI state of at least one of the one or more reference signals, the indication from the network entity comprises a bandwidth part, BWP, indicator for signaling a change of a currently active TCI state or sub-TCI state, the UE is configured or preconfigured with a plurality of different BWP configurations, the plurality of BWP configurations comprising the same center frequency and bandwidth, and each BWP configuration is associated with a different TCI state or a different sub-TCI state.

2. The user device, UE, of claim 1, wherein a TCI state associated with a reference signal comprises a plurality of sub-TCI states, and the UE is to associate a measurement of a reference signal with a currently active sub-TCI state, the indication from the network entity causes a change of the currently active sub-TCI state, and after the indication from the network entity, the UE is to reset the parameters acquired by the measurement of the reference signal by continuing the measurement and associating the measurement with a new active sub-TCI state.

3. The user device, UE, of claim 2, wherein the indication from the network entity comprises a signaling which of the plurality of sub-TCI states is active.

4. The user device, UE, of claim 2, wherein, for transmitting or receiving a transmission associated with the TCI state, the UE is to use one or more parameters acquired by the measurement associated with the currently active sub-TCI state, wherein the sub-TCI state may be indicated with the UL or DL scheduling assignment/grant for the transmission.

5. The user device, UE, of claim 2, wherein the UE is to receive from the network entity an explicit signaling, or an implicit signaling.

6. The user device, UE, of claim 1, wherein
the UE is configured or preconfigured with a plurality of BWP configurations, the plurality of BWP configurations comprising a first BWP configuration and one or more further BWP configurations, the first BWP configuration defining the BWP to be used by the UE, and the one or more further BWP configurations comprising only a reference to the first BWP configuration to be copied, or a reference to one or more of the parameters to be copied from the first BWP configuration, and
each BWP configuration is associated with a different sub-TCI state.

7. The user device, UE, of claim 1, wherein one or some or all of the reference signals are associated with a plurality of TCI states, and wherein each of the plurality of sub-TCI states is a TCI state associated with a reference signal.

8. The user device, UE, of claim 1, wherein
one or some or all of the reference signals are associated with a plurality of TCI states, and the UE is to associate a measurement of a reference signal with a currently active TCI state,
the indication from the network entity causes a change of the currently active TCI state, and
after the indication from the network entity, the UE is to reset the parameters acquired by the measurement of the reference signal by continuing the measurement and associating the measurement with the new active TCI state.

9. The user device, UE, of claim 1, wherein
the UE is to move between a plurality of different locations at which the UE is stationary or an environment of the UE changes between different constellations so that a channel state of a channel between the UE and the network entity changes from time to time and remains quasi-static otherwise, and
the UE is to signal to the network entity information about its stationarity or a certain constellation for allowing the network entity to configure the UE.

10. The user device, UE, of claim 9, wherein the UE is to signal one or more of the following parameters using an information element, IE:
Quasi-static: an index value describing that the using different TCI states or sub-TCI states for one reference signal measurement is enabled or disabled
Stationarity-Index or stationarity status: an index value describing how static the UE or channel is
Time-in-current-status: the time that the UE already spent in the indicated stationarity status, Stationarity-Pattern: a periodicity, duration or pattern of stationarity, e.g., that UE or channel moves in regular intervals, or stationarity is interpreted as a channel stationarity,
Stationarity-Timer: remaining time for which the UE is expected to stay in the indicated stationarity status.

11. The user device, UE, of claim 9, wherein the UE is to signal one or more of the following parameters using a measurement report:
Stationarity-Index or stationarity status: an index value describing how static the UE or channel is,
Time-in-current-status: the time that the UE already spent in the indicated stationarity status,
Stationarity-Pattern: a periodicity, duration or pattern of stationarity, e.g., that UE moves in regular intervals, or stationarity is interpreted as a channel stationarity,
Stationarity-Timer: remaining time for which the UE or channel is expected to stay in the indicated stationarity status,
Channel-Fluctuation-Interval: the UE reports an index which is associated with a channel-fluctuation-interval which describes the thresholds in which the channel fluctuation is expected to stay during the stationary period.

12. The user device, UE, of claim 1, wherein
the UE is to measure one or more particular reference signals, comprised by a received transmission associated with a certain TCI state or sub-TCI state, and use the measured reference signal for a channel estimation between the UE and the network entity,
for one or more further received transmissions associated with the certain TCI state or sub-TCI state, the UE is to use for the channel estimation at least one of the one or more particular reference signals.

13. The user device, UE, of claim 1, wherein
the UE is to transmit one or more particular reference signals embedded in each transmission associated with a certain TCI state or sub-TCI state,
for one or more further transmissions associated with the certain TCI state or sub-TCI state, the UE is to not transmit at least one of the one or more particular reference signals together with the transmission.

* * * * *